United States Patent
Park et al.

(10) Patent No.: US 9,663,359 B2
(45) Date of Patent: May 30, 2017

(54) METHOD FOR PREPARING GRAPHITE POWDER COMPOSITE SUPPORTED BY TRANSITION METAL PARTICLES FOR STORING HYDROGEN

(75) Inventors: Soo Jin Park, Daejeon (KR); Seul Yi Lee, Incheon (KR)

(73) Assignee: Inha-Industry Partnership Institute, Incheon (KR)

(*) Notice: Subject to any disclaimer, the term of this patent is extended or adjusted under 35 U.S.C. 154(b) by 365 days.

(21) Appl. No.: 14/126,150

(22) PCT Filed: May 24, 2012

(86) PCT No.: PCT/KR2012/004104
§ 371 (c)(1),
(2), (4) Date: Dec. 13, 2013

(87) PCT Pub. No.: WO2012/173345
PCT Pub. Date: Dec. 20, 2012

(65) Prior Publication Data
US 2014/0117279 A1   May 1, 2014

(30) Foreign Application Priority Data

Jun. 16, 2011 (KR) .................. 10-2011-0058557

(51) Int. Cl.
| | | |
|---|---|---|
| *C01B 3/00* | (2006.01) | |
| *C01B 31/04* | (2006.01) | |
| *B82Y 30/00* | (2011.01) | |
| *B01J 20/02* | (2006.01) | |
| *B01J 20/20* | (2006.01) | |
| *B01J 20/30* | (2006.01) | |
| *B01J 20/28* | (2006.01) | |
| *B01J 20/32* | (2006.01) | |

(52) U.S. Cl.
CPC ............. *C01B 3/0078* (2013.01); *B01J 20/02* (2013.01); *B01J 20/20* (2013.01); *B01J 20/28016* (2013.01); *B01J 20/305* (2013.01); *B01J 20/3071* (2013.01); *B01J 20/3078* (2013.01); *B01J 20/3204* (2013.01); *B01J 20/3236* (2013.01); *B82Y 30/00* (2013.01); *C01B 3/001* (2013.01); *C01B 3/0021* (2013.01); *C01B 31/043* (2013.01); *Y02E 60/325* (2013.01); *Y02E 60/327* (2013.01)

(58) Field of Classification Search
CPC .................................................. C01B 3/0078

USPC .................................................... 252/188.25
See application file for complete search history.

(56) References Cited

U.S. PATENT DOCUMENTS

| | | | | |
|---|---|---|---|---|
| 5,582,931 A | * | 12/1996 | Kawakami | H01M 6/40 429/127 |
| 6,040,087 A | * | 3/2000 | Kawakami | B22F 1/02 420/900 |
| 6,277,519 B1 | * | 8/2001 | Ishii | B22F 1/0088 29/623.1 |
| 6,596,055 B2 | * | 7/2003 | Cooper | B82Y 30/00 420/900 |
| 2002/0096048 A1 | * | 7/2002 | Cooper | B82Y 30/00 95/116 |
| 2003/0224168 A1 | * | 12/2003 | Mack | B82Y 30/00 428/408 |
| 2005/0079119 A1 | * | 4/2005 | Kawakami | B01J 3/006 423/447.3 |
| 2014/0117279 A1 | * | 5/2014 | Park | C01B 3/001 252/188.25 |

FOREIGN PATENT DOCUMENTS

| | | | |
|---|---|---|---|
| JP | 2003-192316 A | | 7/2003 |
| JP | 2003-321216 A | | 11/2003 |
| JP | 2003321216 A | * | 11/2003 |
| JP | 2006-015291 A | | 1/2006 |
| JP | 2006015291 A | * | 1/2006 |
| KR | 10-2002-0040606 A | | 5/2002 |

OTHER PUBLICATIONS

A Translation of JP 2006015291 into English.*
Yildirim et al.. Phys.Rev.Lett. 94.175501. May 2005.*

* cited by examiner

*Primary Examiner* — Nicole M Buie-Hatcher
*Assistant Examiner* — M. Reza Asdjodi
(74) *Attorney, Agent, or Firm* — Rabin & Berdo, P.C.

(57) ABSTRACT

The present invention relates to a method for preparing a graphite powder composite supported by transition metal particles for storing hydrogen, and more specifically, to a method for preparing a graphite powder composite supported by transition metal particles having significantly improved hydrogen storage capacity, by means of introducing the transition metal particles having support capacity and particle diameters which are controlled, of transition metals such as nickel (Ni), palladium (Pd), platinum (Pt), and yttrium (Y), to an oxidized graphite powder that is provided with functionality through a chemical surface treatment.

3 Claims, 1 Drawing Sheet

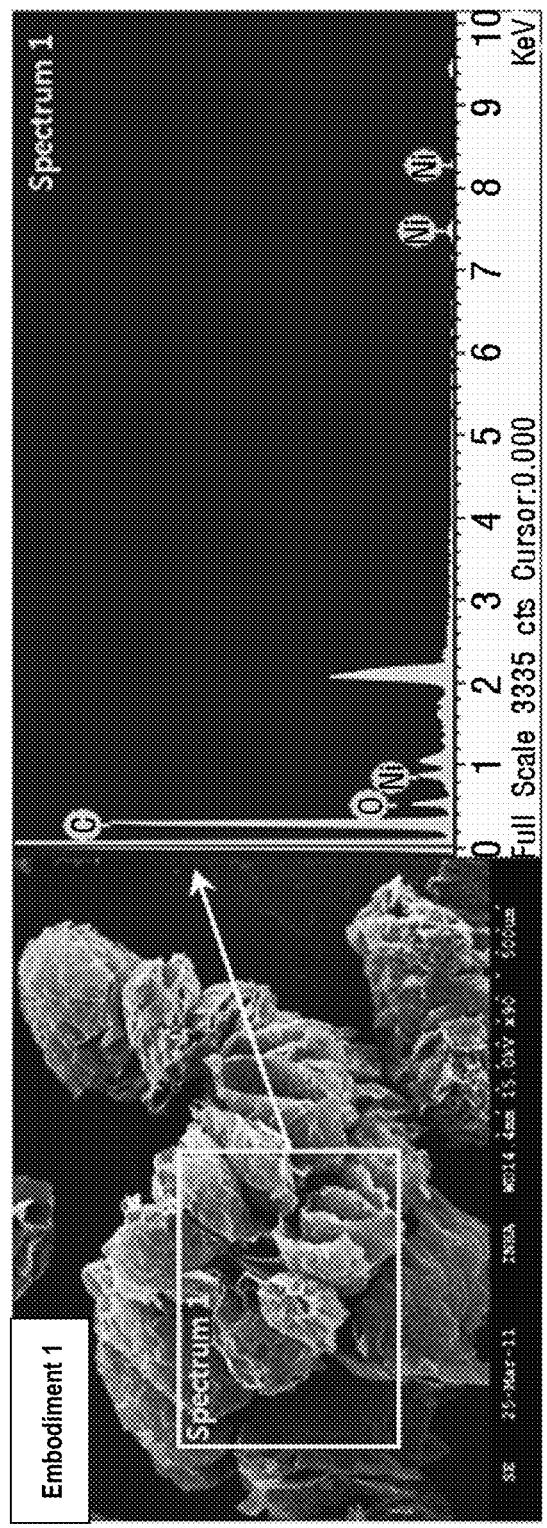

METHOD FOR PREPARING GRAPHITE POWDER COMPOSITE SUPPORTED BY TRANSITION METAL PARTICLES FOR STORING HYDROGEN

TECHNICAL FIELD

The present invention relates to a method for preparing a graphite powder composite supported by transition metal particles for storing hydrogen, and more specifically, to a method for preparing a graphite powder composite supported by transition metal particles having significantly improved hydrogen storage capacity, by means of introducing the transition metal particles having support capacity and particle diameters which are controlled, of transition metals such as Nickel (Ni), Palladium (Pd), Platinum (Pt), and Yttrium (Y), to an oxidized graphite powder that is provided with functionality through a chemical surface treatment.

BACKGROUND ART

As industry has grown rapidly, technology development for environment-friendly clean energy is very urgent for efficient use of energy source and substitution of depleted fossil fuels and environmental preservation.

Accordingly technology development of hydrogen energy gets attention, technology acquisition for hydrogen energy use including hydrogen manufacturing, storage, and transport will be important element to determine national competitiveness and energy security in 21st century.

In case hydrogen is used as energy source, it can be manufactured with water which is infinite and it can be recycled to water after use. And also combustion doesn't emits any pollutant except for only very small amount of NOx.

Besides, hydrogen can be transported as gas or liquid, and can be stored as various type of form such as high-pressure gas, liquid hydrogen, and metal hydride, and etc. And it has merit of being easy to use as fuel by direct combustion or fuel by fuel cell.

Thus, hydrogen can be used in most areas used in from industrial basic materials to normal fuel vehicles, hydrogen planes, and fuel cell, so it is regarded to be the most appropriate for future energy system.

Hydrogen storage technology in hydrogen energy system (production, storage, transport, and use) is most important technology to build up efficient energy system as key technology connecting hydrogen manufacturing and technology using hydrogen.

But, current hydrogen storage technology doesn't meet the target amount presented by US DOE (U.S. Department of Energy).

The technical objectives were revised largely for hydrogen storage capacity for automobile by US DOE in 2009, and target value was 5.5 wt % (room temperature, 100 bar).

Thus, the research is being done for hydrogen storage media focusing on carbon materials among them.

Carbon material is light-weight, and good in corrosion resistance and abrasion resistance, and easy to be treated with.

And also it endures extremely high-temperature, high-pressure conditions compared to other metals, ceramics, and other materials, and it shows 100% reversible hydrogen release behavior by being used as hydrogen storage medium.

Thus, new hydrogen reservoir has been sought continuously, and especially research using carbon material has been proceeded variously.

But, research for lately graphite as highly efficient hydrogen storage medium was recently begun. Graphite, one of abundant natural materials, is of layered space structure where each layer is connected by weak van der Waals force.

For graphite crystal characterized by anisotropic layer structure, carbon atoms in a graphite layer plane are tightly coupled by covalent binding. But layer surface is affected only by weak van der Waals force, thus it is difficult to see the reaction with carbon inside layer surface. Oxidant with strong electron affinity attacks n-electron exposed in graphite layer and easily enters in interlayer and broadens layer spacing without destroying two-dimensional network lattice, and various atom, molecule and ion can be inserted into interlayer, thus it can easily form unique layered compound of graphite.

Accordingly, the inventors of the present invention made efforts to find the optimal functionalization conditions to develop innovative hydrogen storage materials based on conventional graphite powder, and manufactured graphite powder composite containing transition metal particles which is lightweight and affinity of hydrogen is much expressed by manufacturing oxidized graphite powder and introducing transition metal particles of which concentration and diameter are controlled.

Besides, it is confirmed hydrogen storage capacity was improved significantly in the manufactured graphite powder composite containing transition metal particles and the present invention was completed.

DISCLOSURE

Technical Problem

Accordingly, the present invention has been made keeping in mind the above problems occurring in the related art, and an object of the present invention is to provide manufacturing method of graphite powder composite containing transition metal particles for hydrogen storage use of high capacity.

Another object of the present invention is to provide manufacturing method of graphite powder composite containing transition metal particles of highly improved capacity for hydrogen storage by introducing transition metal particles of which optimal concentration and diameter are controlled according to the manufacturing method.

Technical Solution

In order to accomplish the above objects, the present invention provides manufacturing method of graphite powder composite containing transition metal particles by manufacturing oxidized graphite powder which is given functionality by chemical surface treatment and introducing transition metal particles of which concentration and particle diameter are controlled.

In addition, the present invention provides graphite powder composite containing transition metal particles for hydrogen storage manufactured by the method above.

Advantageous Effects

According to the present invention as set forth, the present invention has the merit that it can provide graphite powder composite containing transition metal particles for hydrogen storage with significantly improved storage capacity by introducing optimal concentration of transition metal and transition metal particles of which diameter is controlled to provide affinity of hydrogen in a large amount, compared to conventional commercialized graphite powder.

Hydrogen storage capacity of hydrogen storage medium can be improved significantly according to the present invention.

DESCRIPTION OF DRAWINGS

FIG. 1 illustrates SEM/EDS photo of graphite powder composite containing transition metal particles (Ni) manufactured from the present invention for hydrogen storage.

BEST MODE

Specific features and advantages of the present invention will be more clearly understood from the following detailed description when taken in conjunction with the accompanying drawings. The terminologies or words used in the description and the claims of the present invention should be interpreted based on the meanings and concepts of the invention in keeping with the scope of the invention based on the principle that the inventors can appropriately define the terms in order to describe the invention in the best way. In the following description, it is to be noted that, when the functions of conventional elements and the detailed description of elements related with the present invention may make the gist of the present invention unclear, a detailed description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention provides manufacturing method of graphite powder composite containing transition metal particles of which hydrogen capacity is improved significantly by introducing transition metal particles of which concentration and particle diameter are controlled to oxidized graphite powder which is given functionality by chemical surface treatment.

Specifically, the present invention is characterized in that it comprises (1) step of manufacturing oxidized graphite powder which is given functionality by chemical treatment; and (2) step of introducing transition metal particles of which concentration and particle diameter are controlled to the manufactured oxidized graphite powder.

In the present invention, the said step (1) is characterized in that it manufactures oxidized graphite powder of which functionality is given by adding one or more oxidizing solutions selected from the group of hydrogen peroxide ($H_2O_2 \cdot nH_2O$), aqueous solution of potassium permanganate ($KMnO_4 \cdot nH_2O$), aqueous solution of Potassium thiosulfate ($K_2S_2O_8 \cdot nH_2O$) aqueous chlorine dioxide ($Cl_2O \cdot nH_2O$), and aqueous solution of sodium hypochlorite ($NaClO(aq)$)) to one or more acid solutions selected from the group of sulfuric acid ($H_2SO_4$), nitric acid ($HNO_3$), phosphoric acid ($H_3PO_4$), and hydrochloric acid ($HCl$) and processing chemical surface treatment.

And also, for chemical impregnation process 10 min to 48 hour impregnation is desirable, and the process is characterized in that manufactured oxidized graphite powder after impregnation process are cleaned with distilled water numerous times to be neutralized and filtered, and completely dried at above 80° C. for 6~24 hours, preferably 12 hours.

The chemical impregnation process in the step (1) above is preprocessing process which controls interlayer space to enable introduction of transition metal particles of which concentration and particle diameter are controlled by surface modification of graphite powder.

However, excessive surface treatment is not desirable, for it disrupts the structure of graphite powder.

(2) step of introducing transition metal particles of which concentration and particle diameter are controlled to the manufactured oxidized graphite powder is characterized in that a transition metal precursor is selected and introduced from the group including titanium (Ti), vanadium (V), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), palladium (Pd), silver (Ag), platinum (Pt), and gold (Au) by chemical non-catalytic reduction at room temperature in inert atmosphere.

And, in (2) step the desirable amount of introduced transition metal is 0.01 to 50 wt. m, and preferably 0.05 to 10 wt. % by graphite weight ratio.

And, it is desirable to include the step of reducing transition metal particles after introduction to reducing solvent or non-polar solvent for dispersing graphite powder in step (2).

The reducing solvent above is characterized by being metal hydride of sodium hydroxide) (NaOH), sodium borohydride ($NaBH_4$), lithium aluminum hydride ($LiAlH_4$) or its mixture, and it is desirable to reduce by adding it and heating. Also, it is desirable at pH ranged from 7.0 to 13.

And also, ethylene glycol, diethylene glycol, polyethylene glycol, 1,2-propanediol or dodecanethiol and etc can be used for non-polar solvent for dispersing graphite powder. However there is no special restriction, it is desirable to use ethylene glycol which has proper viscosity and 2OH radical as solvent.

Too small amount of introduced transition metal or too large amount of introduced transition metal is not desirable because too small amount of introduced transition metal as transition metal is difficult to affect as affinity of hydrogen in composite, and too large amount of introduced transition metal put together as cluster particle to obstruct spillover effect and the induction of hydrogen molecules in graphite powder composite.

And, conditions below pH 7 or above pH 14 are not desirable because under conditions below pH 7 or above pH14 transition metal doesn't become reduced to the surface of graphite powder completely.

The present invention provides graphite powder composite containing transition metal particles for hydrogen storage with hydrogen capacity significantly improved, which is manufactured according to the said method.

The graphite powder composite containing transition metal particles for hydrogen storage with hydrogen storage capacity significantly improved is characterized in that introduced amount of transition metal is 0.05 to 20.0 wt. % by weight ratio of graphite powder and diameter of transition metal particles is 1.0 to 20 nm.

And also surface-modified graphite powder composite containing transition metal particles for hydrogen storage with hydrogen storage capacity significantly improved is characterized in that graphite powder composite has 2.0 to 12.0 wt % for hydrogen storage impregnation value.

The present invention will be described more specifically by embodiments as follows.

These embodiments are only for illustrating the present invention; it is obvious to a person having ordinary skill in the art that the scope of the invention is not limited by these examples.

Example 1

Measuring Concentration of Introduced Transition Metal and Morphology Form of Graphite Powder Composite Containing Transition Metal Energy dispersion spectrum (SEM-EDS) of scanning electron microscopy and AAS (atomic absorption spectrometer) are used in order to check the introduced amount of transition metal of surface-modified graphite powder composite containing transition metal, which is weight ratio listed in wt % unit.

Example 2

Measuring Diameter of Transition Metal Particles of Transition Metal Particles of Graphite Powder Composite Containing Transition Metal Particles Wide-angle X-ray diffraction analysis was used in order to observe particle diameter of introduced transition metal, and measurement was made with scan range 5 to 80 o and scan speed 4 o/min using analysis equipment Rigaku Model D/Max-III B installed with Cuk as source.

And also calculation was made using Scherrer's equation at peak where transition metal particles are expressed through acquired X-ray diffraction analysis.

Example 3

Measuring Hydrogen Storage of Graphite Powder Composite Containing Transition Metal Particles In order to measure hydrogen storage of manufactured graphite powder, measurement was made using BEL-HP (BEL Japan) at 298K, and 100 pressure condition after degassing each sample for 6 hours with residual pressure maintained below 10-3 torr at 373K.

Step-by-step approach was used for hydrogen storage measurement, and average sample size at one time was 0.1 g.

Exemplary Embodiment 1

1 g of graphite powder is impregnated with sulfuric acid ($H_2SO_4$, 98%) at room temperature, and then hydrogen peroxide ($H_2O_2$, 35%) is added. And graphite powder is impregnated with mixed solution comprising sulfuric acid and hydrogen peroxide for 24 hours.

Oxidized graphite powder is manufactured by cleaning graphite powder from impregnation process 1~3 times with distilled water and drying completely at 80° C. for 24 hours.

And also 1 g of manufactured oxidized graphite powder is put in ethylene glycol solution in which 5 wt. % Ni is dissolved by weight ratio of oxidized graphite powder and stirring is performed for 1 hour.

And then, pH of mixture is controlled by inputting aqueous solution of NaBH4 and stirring was performed for 4 hours. And stirring was performed at 120° C. for 2 hours, and it was cooled to room temperature.

Graphite powder composite containing transition metal particles manufactured as above was cleaned 1~2 times with distilled water and dried completely at 120° C. for more than 12 hours.

Chemical reduction process introducing the transition metal above was performed under nitrogen ($N_2$) atmosphere.

Exemplary Embodiment 2

1 g of graphite powder is impregnated with sulfuric acid ($H_2SO_4$, 98%) at room temperature, and then hydrogen peroxide ($H_2O_2$, 35%) is added. And graphite powder is impregnated with mixed solution comprising sulfuric acid and hydrogen peroxide for 24 hours.

Oxidized graphite powder is manufactured by cleaning graphite powder from impregnation process 1~3 times with distilled water and drying completely at 80° C. for 24 hours.

And also 1 g of manufactured oxidized graphite powder is put in 1,2-propanediol solution in which 5 wt. % Pd is dissolved by weight ratio of oxidized graphite powder and stirring is performed for 1 hour.

And then, pH of mixture is controlled by inputting aqueous solution of LiAlH4 and stirring was performed for 4 hours. And stirring was performed at 120° C. for 2 hours, and it was cooled to room temperature.

Graphite powder composite containing transition metal particles manufactured as above was cleaned 1~2 times with distilled water and dried completely at 120° C. for more than 12 hours.

Chemical reduction process introducing the transition metal above was performed under nitrogen ($N_2$) atmosphere.

Exemplary Embodiment 3

1 g of graphite powder is impregnated with sulfuric acid ($H_2SO_4$, 98%) at room temperature, and then hydrogen peroxide ($H_2O_2$, 35%) is added. And graphite powder is impregnated with mixed solution comprising sulfuric acid and hydrogen peroxide for 24 hours.

Oxidized graphite powder is manufactured by cleaning graphite powder from impregnation process 1~3 times with distilled water and drying completely at 80° C. for 24 hours.

And also 1 g of manufactured oxidized graphite powder is put in ethylene glycol solution in which 5 wt. % Pt is dissolved by weight ratio of oxidized graphite powder and stirring is performed for 1 hour.

And then, pH of mixture is controlled by inputting aqueous solution of NaOH and stirring was performed for 4 hours. And stirring was performed at 120° C. for 2 hours, and it was cooled to room temperature.

Graphite powder composite containing transition metal particles manufactured as above was cleaned 1~2 times with distilled water and dried completely at 120° C. for more than 12 hours.

Chemical reduction process introducing the transition metal above was performed under nitrogen ($N_2$) atmosphere.

Exemplary Embodiment 4

1 g of graphite powder is impregnated with sulfuric acid ($H_2SO_4$, 98%) at room temperature, and then hydrogen peroxide ($H_2O_2$, 35%) is added. And graphite powder is impregnated with mixed solution comprising sulfuric acid and hydrogen peroxide for 24 hours.

Oxidized graphite powder is manufactured by cleaning graphite powder from impregnation process 1~3 times with distilled water and drying completely at 80° C. for 24 hours.

And also 1 g of manufactured oxidized graphite powder is put in ethylene glycol solution in which 5 wt. % Y is dissolved by weight ratio of oxidized graphite powder and stirring is performed for 1 hour.

And then, pH of mixture is controlled by inputting aqueous solution of NaOH and stirring was performed for 4 hours. And stirring was performed at 120° C. for 2 hours, and it was cooled to room temperature.

Graphite powder composite containing transition metal particles manufactured as above was cleaned 1~2 times with distilled water and dried completely at 120° C. for more than 12 hours.

Chemical reduction process introducing the transition metal above was performed under nitrogen ($N_2$) atmosphere.

Exemplary Embodiment 5

Here, the same process as exemplary embodiment 3 above was performed, but 2 wt % was introduced by weight ratio of transition metal to oxidized graphite powder.

Exemplary Embodiment 7

Here, the same process as exemplary embodiment 3 above was performed, but 10 wt % was introduced by weight ratio of transition metal to oxidized graphite powder.

Comparative Example 1

1 g of graphite powder is impregnated with sulfuric acid ($H_2SO_4$, 98%) at room temperature, and then hydrogen peroxide ($H_2O_2$, 35%) is added. And graphite powder is impregnated with mixed solution comprising sulfuric acid and hydrogen peroxide for 24 hours.

Oxidized graphite powder is manufactured by cleaning graphite powder from impregnation process 1~3 times with distilled water and drying completely at 80° C. for 24 hours.

Table 1 and table 2 below show the result describing the amount of hydrogen adsorption, particle diameter, and concentration of transition metal introduced into surface-modified graphite powder composite.

TABLE 1

Concentration and particle diameter of introduced transition metal of graphite powder composite containing transition metal particles for hydrogen storage according to the present invention.

|  | transition metals | Concentration of introduced transition metal (%) | diameter of transition metal (nm) |
|---|---|---|---|
| exemplary embodiment 1 | Ni | 3.8 | 2.3 |
| exemplary embodiment 2 | Pd | 4.1 | 1.7 |
| exemplary embodiment 3 | Pt | 4.3 | 1.8 |
| exemplary embodiment 4 | Y | 3.5 | 2.1 |
| exemplary embodiment 5 | Pt | 1.4 | 1.8 |
| exemplary embodiment 6 | Pt | 8.7 | 4.4 |
| comparative example 1 | — | — | — |

TABLE 2

Hydrogen storage value of graphite powder composite containing transition metal particles according to the present invention.

|  | hydrogen storage value (wt, %) |
|---|---|
| exemplary embodiment 1 | 9.2 |
| exemplary embodiment 2 | 10.8 |
| exemplary embodiment 3 | 11.5 |
| exemplary embodiment 4 | 3.2 |
| exemplary embodiment 5 | 9.8 |
| exemplary embodiment 6 | 7.8 |
| comparative example 1 | 1.8 |

It was confirmed hydrogen storage value of graphite powder composite containing transition metal particles manufactured by the present invention was improved by 77 to 539% in comparison with comparative example 1.

Hydrogen molecule is dissociated from transition metal surface which is introduced to the surface of the graphite powder, and a hydrogen atom is and moves on the carbon surface, which is determined to be due to spillover mechanism.

Among them, it was confirmed hydrogen storage values of exemplary embodiment 3 where platinum particle is contained appeared highest among exemplary embodiment 1~4 in which 5 wt % transition metal for weight of graphite powder was introduced.

In addition, as compared to exemplary embodiment 5 and exemplary embodiment 6, it is difficult for too small amount of introduced transition metal to affect as affinity of hydrogen on the surface of graphite powder (exemplary embodiment 5) and too large amount of introduced transition metal put together as cluster particle and obstructs spillover effect and the induction of hydrogen molecules in graphite powder composite so that hydrogen storage value was reduced (exemplary embodiment 6).

Specific part of the contents of the present invention was described in detail, such a specific description is only preferred embodiments to a person of ordinary skill in the art, thus it will be obvious the scope of the invention is not be limited by any specific description.

Thus, the substantial scope of the present invention is to be defined by the claims and equivalents thereof attached.

What is claimed is:

1. A method of manufacturing graphite powder composite containing transition metal particles for hydrogen storage comprising the steps of: (1) manufacturing oxidized graphite powder by chemical surface treatment; and (2) thereafter introducing transition metal particles to the oxidized graphite powder wherein the concentration and diameter of introduced transition metal particles is controlled by the chemical surface treatment and wherein the manufactured graphite powder composite has a hydrogen storage capacity of greater than 3% by weight and wherein at step (2) the transition metal particles are introduced as a transition metal precursor containing one or more nitrate hydrates selected from the group of titanium (Ti), vanadium (V), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), palladium (Pd), silver (Ag), platinum (Pt), and gold (Au) by chemical non-catalytic reduction at room temperature in inert atmosphere and wherein at step 2 transition metal particles are introduced by first being dissolved in a reducing solvent or nonpolar solvent and thereafter combining with the oxidized graphite powder of step 1.

2. The method of manufacturing graphite powder composite containing transition metal particles for hydrogen storage according to claim 1, wherein the reducing solvent is selected from sodium hydroxide (NaOH), sodium borohydride ($NaBH_4$), lithium aluminum hydride ($LiAlH_4$) or a mixture thereof.

3. The method of manufacturing graphite powder composite containing transition metal particles for hydrogen storage according to claim 1, wherein the non-polar solvent for dispersing graphite powder is one or more selected from the group of ethylene glycol, diethylene glycol, polyethylene glycol, 1,2-propanediol or dodecanethiol.

* * * * *